(12) United States Patent
Yamamoto et al.

(10) Patent No.: US 7,286,688 B2
(45) Date of Patent: Oct. 23, 2007

(54) OBJECT DETECTION APPARATUS, DISTANCE MEASURING APPARATUS AND OBJECT DETECTION METHOD

(75) Inventors: Kazuhiko Yamamoto, Gifu (JP); Kunihito Kato, Nagoya (JP); Ayami Iwata, Gifu-ken (JP)

(73) Assignee: Gifu University, Gifu (JP)

( * ) Notice: Subject to any disclaimer, the term of this patent is extended or adjusted under 35 U.S.C. 154(b) by 782 days.

(21) Appl. No.: 10/788,780

(22) Filed: Feb. 27, 2004

(65) Prior Publication Data
US 2005/0111697 A1    May 26, 2005

(30) Foreign Application Priority Data
Nov. 26, 2003  (JP)  ............... 2003-395942

(51) Int. Cl.
*G06K 9/00* (2006.01)
(52) U.S. Cl. .................................. 382/103; 382/107
(58) Field of Classification Search ................ 382/100, 382/103, 107, 149, 236, 287; 348/94, 125, 348/152, 154, 155, 208.1, 208.2, 208.16, 348/347, 352, 353, 356, 425, 449, 465, 558, 348/587, 592, 604, 700, 703
See application file for complete search history.

(56) References Cited
U.S. PATENT DOCUMENTS
5,109,425 A * 4/1992 Lawton .................. 382/107

5,754,677 A * 5/1998 Kawada .................. 382/141
5,916,168 A * 6/1999 Pedersen et al. ............. 600/443

FOREIGN PATENT DOCUMENTS

| JP | 07-181024 | 7/1995 |
|----|-----------|--------|
| JP | 09-153138 | 6/1997 |
| JP | 10-267955 | 10/1998 |
| JP | 2001-116527 | 4/2001 |
| JP | 2001-266160 | 9/2001 |
| JP | 2001-307104 | 11/2001 |
| JP | 2003-196664 | 7/2003 |

OTHER PUBLICATIONS

Iwata et al., "Segmentation of Object Region Using Properties of the Horizon View Camera," The Institute of Electronics, 103:37-42, 2003.

* cited by examiner

*Primary Examiner*—Samir Ahmed
*Assistant Examiner*—Abolfazl Tabatabai
(74) *Attorney, Agent, or Firm*—Occhiuti Rohlicek & Tsao LLP

(57) ABSTRACT

A mobile unit moves on a reference plane. The mobile unit has an object detection apparatus for detecting an object on the reference plane. The object detection apparatus includes a camera, a mirror, and a computer. The mirror cuts an image received by the camera such that the camera receives an image that is divided into a reference plane image and an object image. The reference plane image contains the reference plane. The object image contains the object and does not contain the reference plane. Therefore, the distance measuring apparatus can easily separate the region including the object and the region including no object, and accurately detect the distance to the object.

20 Claims, 4 Drawing Sheets

OBJECT DETECTION APPARATUS, DISTANCE MEASURING APPARATUS AND OBJECT DETECTION METHOD

BACKGROUND OF THE INVENTION

The present invention relates to an object detection apparatus, a distance measuring apparatus, and an object detection method.

An object detection method is known in which an object is detected by radiating a wave such as a radio wave, an ultrasonic wave or light to an object and detecting a reflected wave from the object. The time period from the moment at which the wave is radiated to the moment at which the reflected wave is detected is measured to enable computation of the distance from the wave radiation position to the object. This method, however, cannot be used with respect to an object having a wave absorbing property.

Japanese Laid-Open Patent Publication No. 2003-196664 discloses an object detection apparatus which detects an object on the basis of an image picked up by an image pickup device such as a CCD camera. This object detection apparatus obtains two or more images picked up successively with respect to time and computes optical flows from the obtained images. The object detection apparatus separates each image into a region predicted to include the object and a region predicted to include no object portion. The object detection apparatus executes predetermined processing, e.g., pattern matching on the predicted object-including region to detect the object from the region. This kind of object detection apparatus is capable of detecting an object without being influenced by the properties of the object, e.g., the property of easily absorbing waves. After the detection of the object, the distance to the object can be obtained on the basis of the principle of triangulation for example.

The object detection apparatus disclosed in Japanese Laid-Open Patent Publication No. 2003-196664 requires complicated computation processing for separating a region including an object and a region including no object portion from an obtained image. In this computation processing, if the object has a shadow, there is a possibility of the shadow being erroneously recognized as a portion of the object. For this reason, the object detection apparatus cannot detect the object with accuracy. As a result, the distance to the object cannot be computed with accuracy.

SUMMARY OF THE INVENTION

An object of the present invention is to provide an object detection apparatus and an object detection method capable of improving the accuracy with which an object is detected, and a distance measuring apparatus capable of improving the accuracy with which the distance to the object is measured.

To achieve the above objective, the present invention provides an object detection apparatus for detecting an object on a reference plane. Relative positions of the object and the object detection apparatus change on the reference plane. The apparatus includes an image pickup device, an image cutting section and a computer. The image pickup device captures an image in a predetermined image pickup area, thereby obtains image data. The image cutting section cuts an image received by the image pickup device such that the image pickup device receives an image that is divided into a reference plane image and an object image by a predetermined boundary. The reference plane image contains the reference plane. The object image contains the object and does not contain the reference plane. From image data obtained by the image pickup device, the computer obtains reference plane image data corresponding to the reference plane image and object image data corresponding to the object image. The computer computes relative positions of the object and the object detection apparatus on the reference plane based on an optical flow obtained from the reference plane image data and an optical flow obtained from the object image data.

According to another aspect of the invention, a distance measuring apparatus that is mounted on a mobile unit that moves on a reference plane is provided. The apparatus measures a distance from the mobile unit to an object. The apparatus includes an image acquisition section, a movement amount computation section and a distance computation section. The image acquisition section obtains a reference plane image and an object image. The movement amount computation section computes an amount of movement of the mobile unit based on an optical flow obtained from the reference plane image. The distance computation section computes a distance from the mobile unit to the object based on an optical flow obtained from the object image and the amount of movement of the mobile unit computed by the movement amount computation section.

In addition, present invention may be applicable to provide an object detection method for detecting an object on a reference plane using an image pickup device. Relative positions of the object and an object detection apparatus change on the reference plane. The method includes cutting an image received by the image pickup device such that the image pickup device receives an image that is divided into a reference plane image and an object image by a predetermined boundary. The method further includes obtaining reference plane image data corresponding to the reference plane image and object image data corresponding to the object image from image data obtained by the image pickup device. The method further includes computing relative positions of the object and the object detection apparatus on the reference plane based on an optical flow obtained from the reference plane image data and an optical flow obtained from the object image data.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An embodiment of the present invention will be described with reference to the accompanying drawings.

Figure 1:
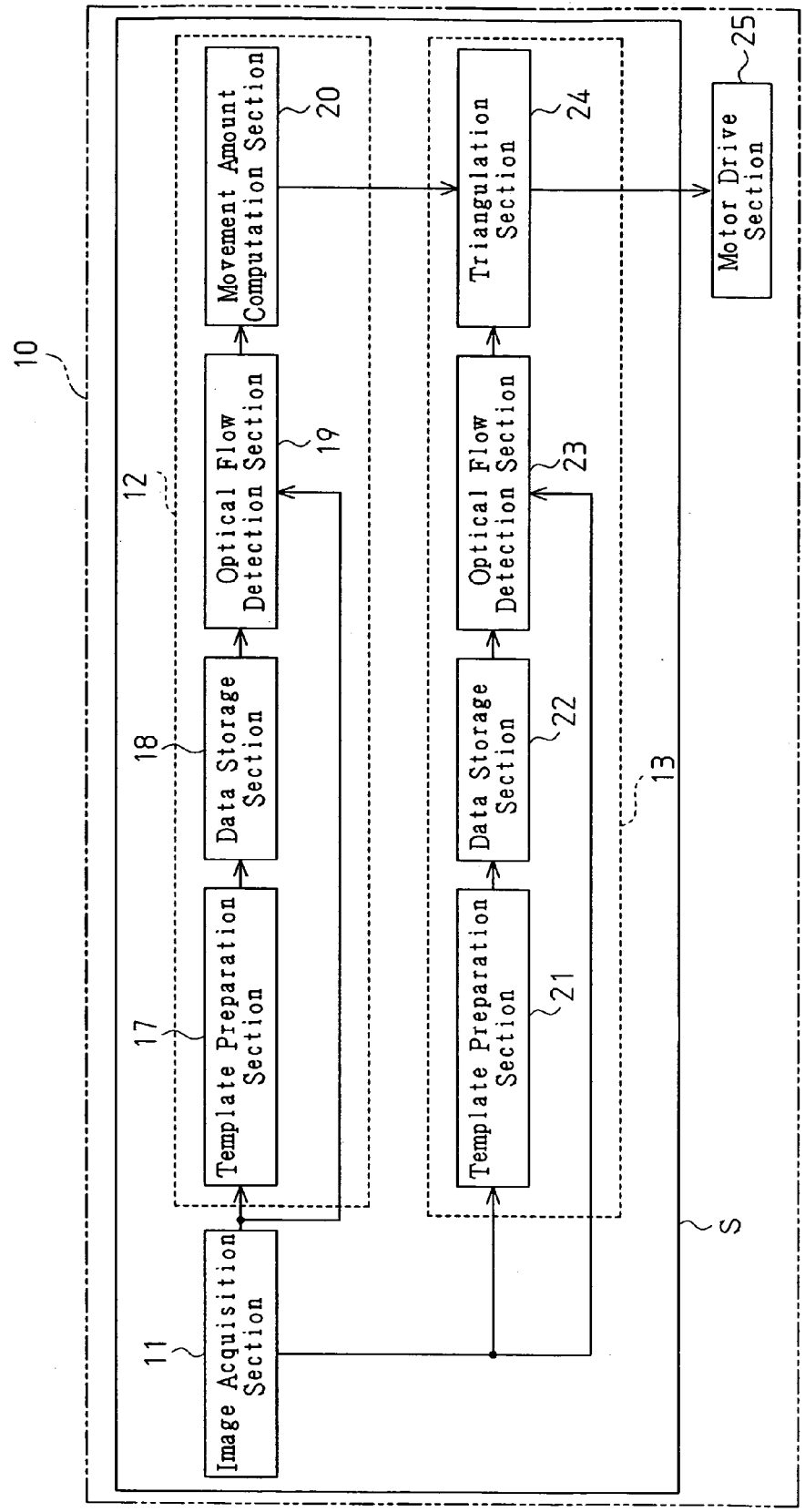
FIG. 1 is a block diagram showing an electrical configuration of a distance measuring apparatus in an embodiment of the present invention.

As shown in FIG. 1, a distance measuring apparatus S is mounted on a mobile unit 10. The mobile unit 10 is an autonomous robot capable of moving on a reference plane M, e.g., the ground, a sweeping robot in this embodiment. The mobile unit 10 moves on the reference plane M in a direction parallel to the reference plane M. The distance measuring apparatus S detects an obstacle, i.e., an object B, on the reference plane M, and measures the distance D (see FIG. 2) between the object B and the mobile unit 10. The mobile unit 10 uses data on the distance D measured by the distance measuring apparatus S in order to avoid contact with the object B.

The distance measuring apparatus S has an image acquisition section 11, a movement amount computation section 12, and a distance computation section 13. The image acquisition section 11 obtains image data on the object B and supplies the obtained image data to the movement amount computation section 12 and the distance computation section 13. The movement amount computation section 12 computes the amount of movement of the mobile unit 10 on the basis of the image data supplied from the image acquisition section 11, and supplies data on the computed movement amount to the distance computation section 13. The distance computation section 13 computes the distance D from the mobile unit 10 to the object B on the basis of the image data supplied from the image acquisition section 11 and the movement amount data supplied from the movement amount computation section 12. Preferably, each of the movement amount computation section 12 and the distance computation section 13 comprises a computer.

Figure 2:
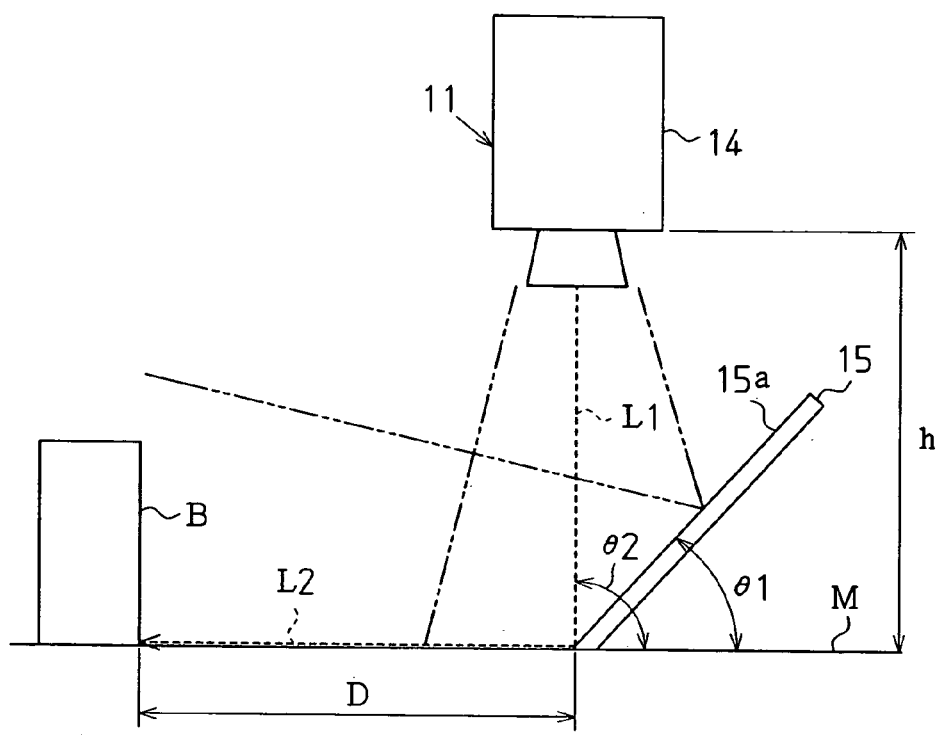
FIG. 2 is a diagram schematically showing the construction of an image acquisition section in the distance measuring apparatus shown in FIG. 1.

As shown in FIG. 2, the image acquisition section 11 includes a monocular camera 14, e.g., a CCD camera or a CMOS camera which functions as an image pickup device, and a mirror 15 in the form of a flat plate which functions as a reflecting body. The camera 14 is positioned above the mirror 15. The double-dot dash line in FIG. 2 indicates the image pickup area of the camera 14.

The mirror 15 faces upward as viewed in FIG. 2. That is, the mirror 15 has a reflecting surface 15a facing the camera 14. The reflecting surface 15a is set at a predetermined angle θ1 from the reference plane M. The optical axis of the imaging lens of the camera 14 includes a first optical axis portion L1 from the camera 14 to an incident point on the reflecting surface 15a of the mirror 15, and a second optical axis portion L2 which projects subsequent to the first optical axis portion L1 from the reflecting surface 15a. The first optical axis portion L1 is at a predetermined angle θ2 from the reference plane M. The angle θ1 and the angle θ2 are set so that the second optical axis portion L2 is parallel to the reference plane M and extends close to the reference plane M. That is, there is a relationship: angle θ2=angle θ1×2. In this embodiment, angle θ1=45° and angle θ2=90°. The mirror 15 is placed in the vicinity of the reference plane M and a certain gap is provided between the mirror 15 and the reference plane M.

Figure 3:
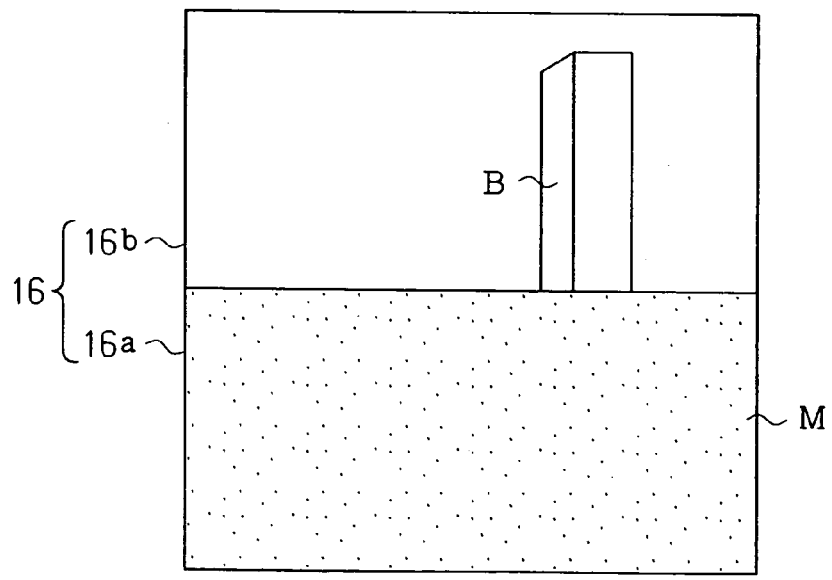
FIG. 3 is a diagram schematically showing an image obtained by the image acquisition section in the distance measuring apparatus shown in FIG. 1.

As shown in FIG. 3, an image 16 picked up by the camera 14 has two image portions, i.e., a reference plane image 16a and an object image 16b. The reference plane image 16a includes no image reflected by the mirror 15 and includes an image directly picked up without interposing the mirror 15. The reference plane image 16a includes only an image of the reference plane M. The reference plane image 16a shows a normal view of the reference plane M. The object image 16b includes an image reflected by the mirror 15. The object image 16b includes only an image of the object B and includes no image of the reference plane M. That is, the object image 16b includes no shadow of the object B.

In this embodiment, the object image 16b occupies the upper half of the image 16 above the boundary corresponding to the optical axis L, and the reference plane image 16a occupies the lower half. That is, the mirror 15 cuts an image received by the camera 14 such that an image that is divided into the reference plane image 16a and the object image 16b enters the camera 14.

The image acquisition section 11 obtains image 16 at predetermined time intervals with the camera 14. The image acquisition section 11 converts the obtained image 16 into an electrical signal and supplies the signal to the movement amount computation section 12 and the distance computation section 13. More specifically, the movement amount computation section 12 obtains image data on the reference plane image 16a from the image acquisition section 11, while the distance computation section 13 obtains image data on the object image 16b from the image acquisition section 11.

(Movement Amount Computation Section 12)

The movement amount computation section 12 includes a first template preparation section 17, a first data storage section 18, a first optical flow detection section 19 and a computation section 20. The sections 17 to 20 represent the functions of the computer. The first template preparation section 17 and the first optical flow detection section 19 obtain image data on the reference plane image 16a from the image acquisition section 11.

Figure 4:
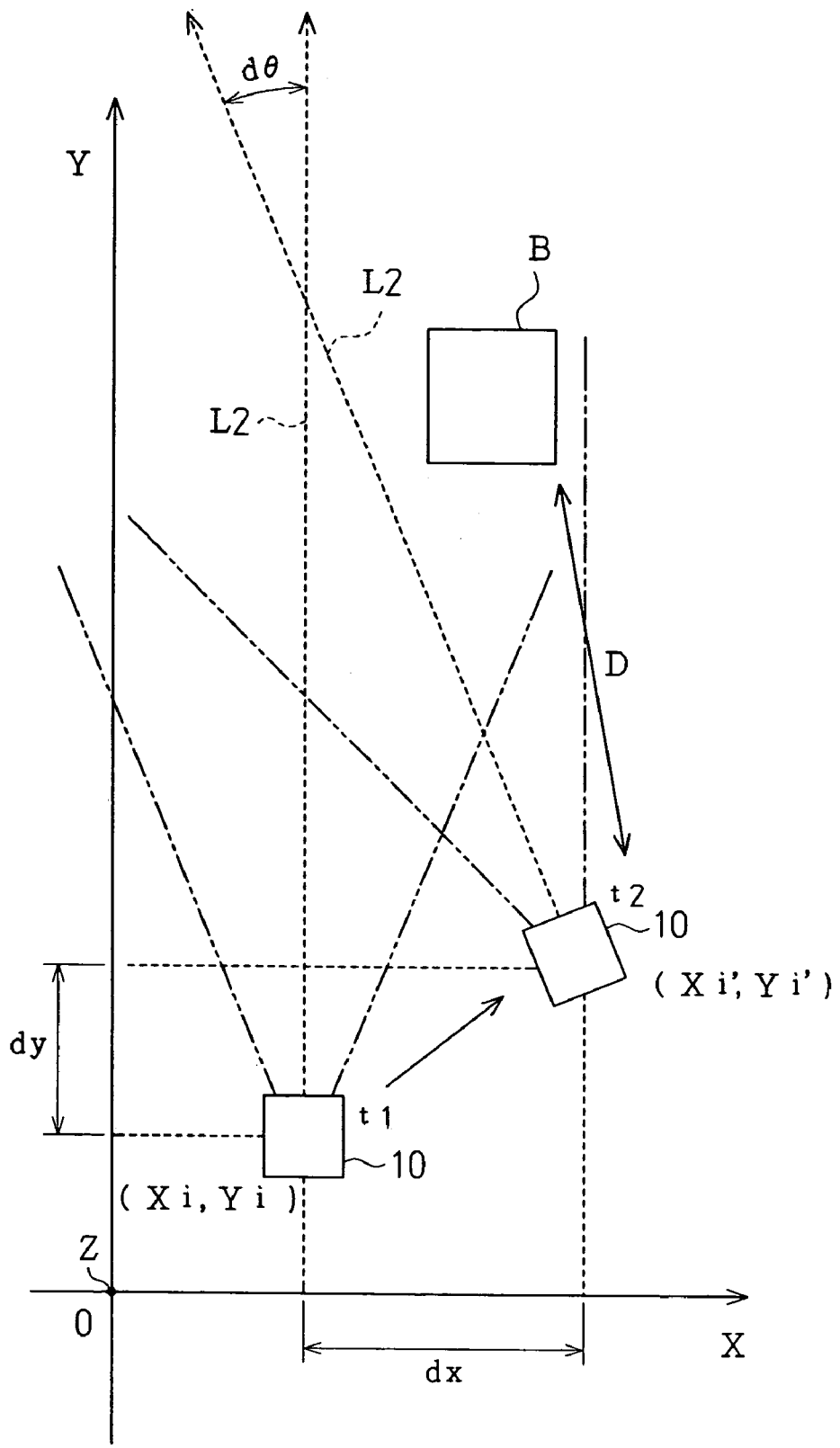
FIG. 4 is a diagram showing the relationship between a mobile unit on which the distance measuring apparatus shown in FIG. 1 is mounted and an object.

FIG. 4 shows the position of the mobile unit 10 at a time t1 and the position of the mobile unit 10 at a time t2 after a lapse of a predetermined time period from time t1. The first template preparation section 17 prepares templates Ti(n), the total number of which is represented by the letter n (n is plural, 1≦i≦n), from the reference plane image 16a obtained at time t1. That is, the first template preparation section 17 divides the reference plane image 16a into n regions and forms template Ti(n) with respect to each region. Template Ti(n) in this embodiment shows a luminance pattern on the corresponding region. The first template preparation section 17 stores data on the obtained templates Ti(n) in the first data storage section 18.

The first data storage section 18 has a memory (not shown). The first data storage section 18 stores in the memory the data on templates Ti(n) supplied from the first template preparation section 17. That is, the first data storage section 18 records templates Ti(n) corresponding to the reference plane image 16a at predetermined time intervals.

When image data on the reference plane image 16a obtained at time t2 is supplied from the image acquisition section 11 to the first optical flow detection section 19, the first optical flow detection section 19 reads out from the first data storage section 18 templates Ti(n) obtained at time t1 before time t2. The first optical flow detection section 19 then performs comparison between the obtained templates Ti(n) and the image data on the reference plane image 16a obtained at time t2, i.e., template matching, to obtain optical flows on the reference plane image 16a, i.e., plane optical flows. The optical flows are expressed by velocity vectors of points in the image.

A process in which the movement amount computation section 12 obtains the optical flow on the reference plane image 16a will be described below in detail.

First, the first optical flow detection section 19 records the coordinates of a representative point of each template Ti(n), e.g., a center point of each template Ti(n) as coordinates (Xi, Yi) of a start point of an optical flow.

Subsequently, the first optical flow detection section 19 moves each template Ti(n) in the reference plane image 16a obtained at time t2 to detect a region of the reference plane image 16a which coincides with or similar to template Ti(n) in the luminance pattern, i.e., a matching region. When a matching region is detected, the first optical flow detection section 19 records a representative point in the obtained matching region, i.e., a center point of the matching region, as coordinates (Xi', Yi') of an end point of the optical flow. The first optical flow detection section 19 records the coordinates of the start and end points of all the templates Ti(n). The first optical flow detection section 19 supplies the coordinates of the start and end points of the obtained optical flows to the computation section 20.

The computation section performs Hough transform by using the coordinates (Xi, Yi) of the start points and the coordinates (Xi', Yi') of the end points of the input optical flows to compute the amount of movement of the mobile unit 10.

For example, the reference plane M is assumed to be an X-Y plane, as shown in FIG. 4. The amount of rotation of the mobile unit 10 about the Z-axis perpendicular to the X-Y plane, i.e., the amount of rotation of the distance measuring apparatus S, when the mobile unit 10 moves on the reference plane M is represented by dθ. The rotation amount dθ is the angle between the second optical axis portion L2 obtained at time t1 and the second optical axis portion L2 obtained at time t2. The distance from the reference plane M to the camera 14 is represented by h (see FIG. 2). In this case, the following equation 1 shows the amount of movement dx of the mobile unit 10 in the X-axis direction, and equation 2 shows the amount of movement dy in the Y-axis direction.

$$dx = \frac{h}{f_{11}}\{(X_i - f_{13}) - (X_i' - f_{13})\cos d\theta\} + \frac{h}{f_{22}}(Y_i' - f_{23})\sin d\theta \quad (1)$$

$$dy = -\frac{h}{f_{11}}(X_i' - f_{13})\sin d\theta + \frac{h}{f_{22}}\{(Y_i - f_{13}) - (Y_i' - f_{23})\cos d\theta\} \quad (2)$$

Terms $f_{11}$, $f_{13}$, $f_{22}$, and $f_{23}$ in equations 1 and 2 shown above are internal parameters of the camera 14. The internal parameters are values determined according to manufacturing or assembly errors of the camera 14 and an optical device, e.g., a CCD in the camera 14.

The computation section 20 obtains a plurality of Hough curves corresponding to the optical flows by substituting in equations 1 and 2 the coordinates (Xi, Yi) of the start points and the coordinates (Xi', Yi') of the end points of the optical flows obtained by the above-described template matching and by substituting values from 0 to 360° in dθ in equations 1 and 2. The computation section 20 computes the values of dx, dy and dθ corresponding to a point at which the largest number of Hough curves intersect as affine transformation parameters (dx, dy and dθ), i.e., the amount of movement of the mobile unit 10. The computation section 20 supplies the obtained movement amount (dx, dy and dθ) to a triangulation section 24.

(Distance Computation Section 13)

The distance computation section 13 includes a second template preparation section 21, a second data storage section 22, a second optical flow detection section 23 and the triangulation section 24. The sections 21 to 24 represent functions of the computer. The second template preparation section 21 and the second optical flow detection section 23 obtain image data on the object image 16b from the image acquisition section 11.

The second template preparation section 21 prepares templates Tk(m), the total number of which is represented by the letter m ($1 \leq k \leq m$), on the basis of image data on the object image 16b obtained at time t1, as does the first template preparation section 17 in the above-described movement amount computation section 12. The second template preparation section 21 supplies the obtained templates Tk(m) to the second data storage section 22. The second data storage section 22 stores the templates Tk(m) in a memory (not shown).

When image data on the object image 16b obtained at time t2 is input, the second optical flow detection section 23 reads out from the second data storage section 22 templates Tk(m) obtained at time t1 before time t2. The second optical flow detection section 23 performs comparison (template matching) between the templates Tm(k) and the image data on the object image 16b obtained at time t2 to obtain optical flows on the object image 16b, i.e., object optical flows, as does the above-described first optical flow detection section 19. The second optical flow detection section 23 supplies coordinates (Uk, Vk) of the start points and coordinates (Uk', Vk') of the end points of the obtained optical flows to the triangulation section 24.

The triangulation section 24 detects the object B by using the obtained data on the optical flows. More specifically, the triangulation section 24 computes the distance D to the object B by using the principle of triangulation on the basis of the coordinates (Uk, Vk) of the start points and the coordinates (Uk', Vk') of the end points of the optical flows input from the second optical flow detection section 23 with respect to the object image 16b and the amount of movement (dx, dy, dθ) input from the computation section 20 in the movement amount computation section 12. More specifically, the triangulation section 24 computes the distance D by equations 3 and 4 shown below.

$$D = \frac{-h(U_k' - f_{13})\{(U_k - f_{13})\sin d\theta - f_{11}\cos d\theta\} + f_{11}\{f_{11}dx - (dy + h)(U_k - f_{13})\}}{(U_k' - f_{13})\{(U_k - f_{13})\sin d\theta - f_{11}\cos d\theta\} + f_{11}\{(U_k - f_{13})\cos d\theta + f_{11}\sin d\theta\}} \quad (3)$$

in the case where |Uk−Uk'|≧|Vk−Vk'|.

$$D = \frac{-(V_k - f_{23})\{h\sin d\theta(U_k' - f_{13}) + f_{11}(dy + h)\} + hf_{11}(V_k' - f_{23})}{(V_k - f_{23})\{\sin d\theta(U_k' - f_{13}) + f_{11}\cos d\theta\} - f_{11}(V_k' - f_{23})} \quad (4)$$

in the case where |Uk−Uk'|<|Vk−Vk'|.

The triangulation section 24 supplies data on the obtained distance D to a motor drive section 26 provided on the mobile unit 10.

The motor drive section 26 supplies a drive current to motors for driving tires, caterpillar treads or the like of the mobile unit 10. The motor drive section 26 controls the motors by using the data on the distance D so that the mobile unit 10 and the object B do not contact each other.

As described above, the distance measuring apparatus S of this embodiment has advantages described below.

(1) The mirror 15 cuts an image received by the camera 14 such that the image 16, which is divided into the reference plane image 16a and the object image 16b, is received by the camera 14. The reference plane image 16a contains the reference plane M, and the object image 16b contains the object B and does not contain the reference plane M. Therefore, the distance measuring apparatus S can easily separate the region including the object B and the region including no object B. The object image 16b includes no shadow of the object B. That is, the distance measuring apparatus S functions as an object detection apparatus, which can computes relative positions of the object B and the distance measuring apparatus S on the reference plane M with accuracy.

(2) The distance measuring apparatus S computes the amount of movement of the mobile unit 10 on the basis of a plurality of reference plane image portions 16a obtained at different times, and measures the distance D to the object B on the basis of the obtained movement amount and a plurality of object image portions 16b obtained at different times. Therefore, the distance measuring apparatus S can measure the distance D with accuracy.

(3) In the distance measuring apparatus S, the direction of the optical axis L of the camera 14 is adjusted so that the optical axis L is parallel to the reference plane M and close to the reference plane M, that is, the distance from the reference plane M to the second optical axis portion L2 is not larger than the height of the object B. Therefore, the reference plane image 16a and the object image 16b can be reliably cut out from the image 16.

(4) The distance measuring apparatus S has the mirror 15 capable of adjusting the direction of the optical axis L. Therefore, the direction of the optical axis L can be easily adjusted by adjusting the direction of the mirror 15. That is, the construction of the distance measuring apparatus S can be simplified. Also, the configuration increases the degree of flexibility in the position of the camera 14.

(5) The angle θ1 between the reflecting surface 15a and the reference plane M and the angle θ2 between the optical axis L at the incident position on the reflecting surface 15a and the reference plane M are set so as to satisfy a relation expression θ2=θ1×2. The setting according to this simple relation expression ensures that the image reflected by the reflecting surface 15a of the mirror 15 can be obtained as the reference plane image 16a from which the reference plane M is excluded and in which the object B is included.

(6) Angle θ2 is 90°. That is, an image corresponding to a normal view of the reference plane M can be obtained as the reference plane image 16a. That is, the optical flows with respect to the reference plane image 16a include no amount of movement in the height direction, i.e., the Z-direction in the case where the reference plane M is the X-Y plane, and represent only the amount of movement in a direction parallel to the reference plane M. Therefore, the amount of movement of the mobile unit 10 can be easily obtained from a plurality of reference plane image portions 16a. Also, the area of the reference plane image 16a can be restricted below the camera 14. That is, inclusion of any object other than the reference plane M can be limited in the reference plane image 16a.

(7) The computation section 20 performs Hough transform by using the coordinates of the starting and end points of at least two optical flows when obtaining the amount of movement of the mobile unit 10. In general, a plurality of optical flows are obtained from a plurality of images obtained at different times. There is a possibility of these optical flows including an optical flow having no correlation with the amount of movement of the mobile unit 10. Hough transform is performed on the coordinates of the start and end points of these obtained optical flows to enable estimation of the amount of movement of the mobile unit 10 with no influence of the optical flow having no correlation with the amount of movement. Thus, the amount of movement of the mobile unit 10 can be obtained by using Hough transform, which is an existing method, without developing a new algorithm for estimation of the amount of movement of the mobile unit 10 from optical flows. Therefore, the cost of development of the distance measuring apparatus S can be limited.

(8) In the image 16, the size of the reference plane image 16a is the same as that of the object image 16b. Therefore, it is easy to balance the computation load for computation of optical flows in the movement amount computation section 12 and the computation load for computation of optical flows in the distance computation section 13. That is, computation load unevenness can be reduced.

The invention may be embodied in the following forms.

In the above-described embodiment, the camera 14 is placed so that the angle θ2=90° and the mirror 15 is placed so that the angle θ1=45°. However, as long as the relationship: angle θ2=θ1×2 is maintained, the angle θ1 is not limited to 45° and the angle θ2 is not limited to 90°. For example, angle θ1=30° and angle θ2=60° may be set. Also, the angle θ2 may be set to a value larger than 90°. For example, angle θ1=60° and angle θ2=120° may be set.

Figure 5:
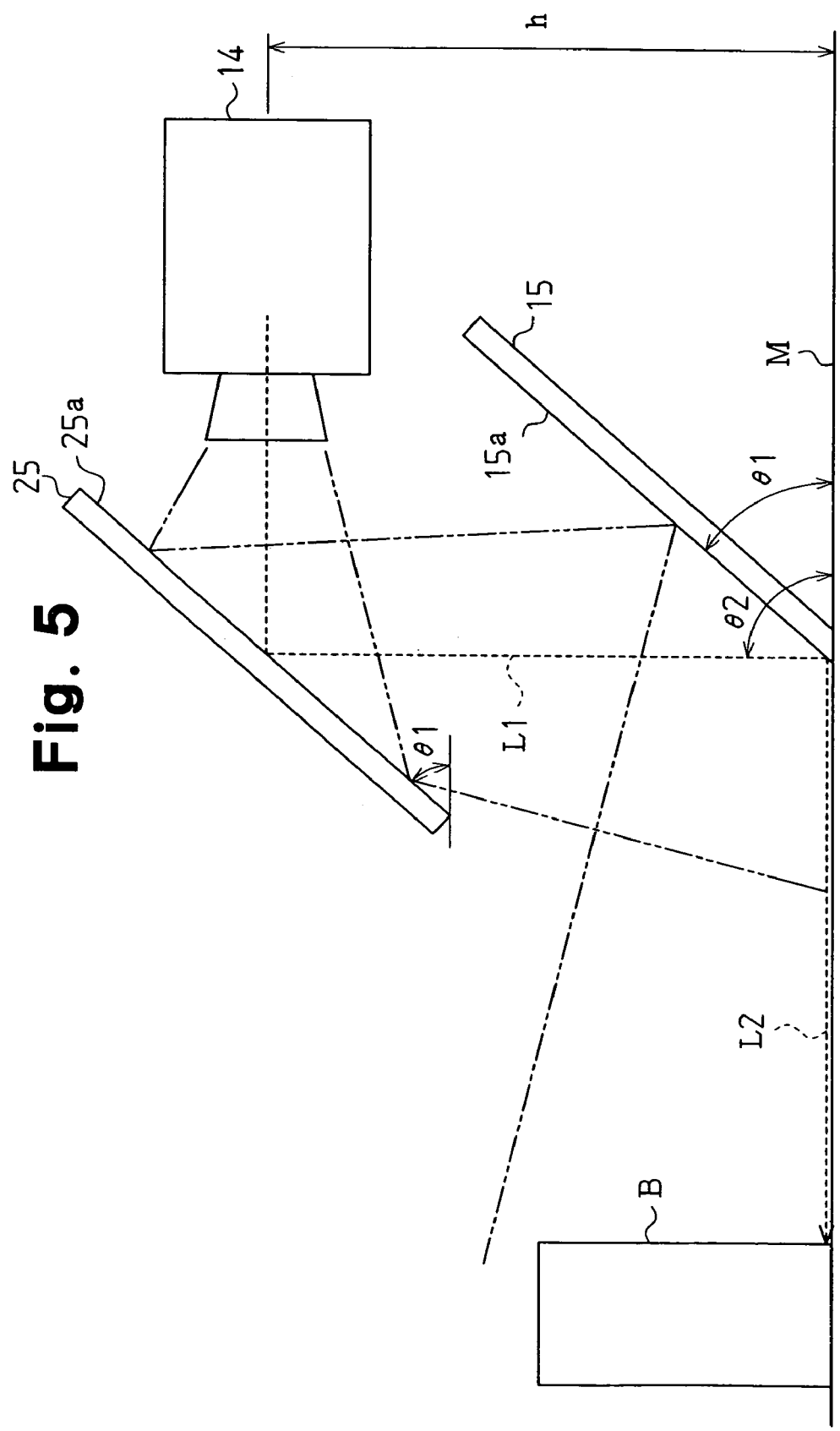
FIG. 5 is a diagram schematically showing the construction of an image acquisition section in a distance measuring apparatus in another embodiment of the present invention.

In the above-described embodiment, the image acquisition section 11 obtains the reference plane image 16a and the object image 16b by using the single mirror 15. However, the image acquisition section 11 may be provided with a mirror 25 in addition to the mirror 15, for example, as shown in FIG. 5 to obtain the reference plane image 16a and the object image 16b. The mirror 25 is placed above the mirror 15. The mirror 25 is places so that a reflecting surface 25a of the mirror 25 faces downward and is parallel to the reflecting surface 15a of the mirror 15. The camera 14 is placed so as laterally face the reflecting surface 25a. That is, in this modification, while the angle θ2 is maintained at 90°, the direction of the first optical axis L1 is changed by the mirror 25 placed between the mirror 15 and the camera 14. Therefore, the degree of the flexibility in the position of the camera 14 is further improved. Since the camera 14 is placed so as to laterally face the mirror 25, the size of the distance measuring apparatus S can be reduced in the height direction.

In the above-described embodiment, the optical axis is reflected by the mirror 15, i.e., the reflecting portion in order to adjust the direction of the optical axis L of the camera 14. Alternatively, the optical axis of the camera 14 may be, for example, refracted by a prism to adjust the direction of the optical axis.

In the above-described embodiment, the movement amount computation section 12 performs Hough transform in order to obtain the amount of movement (dx, dy, dθ). However, the movement amount computation section 12 may use a clustering method, for example. In the clustering method, the first optical flow detection section 19 first selects two of the optical flows obtained by template matching. The first optical flow detection section 19 then computes the amount of rotation dθ by the following equation 5 on the basis of the coordinates of the start and end points of the selected first and second optical flows.

$$d\theta = \tan^{-1} \frac{(Y_i - Y_j)(X_i' - X_j') - (X_i - X_j)(Y_i' - Y_j')}{\frac{f_{11}}{f_{22}}(Y_i - Y_j)(Y_i' - Y_j') + \frac{f_{22}}{f_{11}}(X_i - X_j)(X_i' - X_j')} \quad (5)$$

In this case, the coordinates of the start point of the first optical flow are expressed as (Xi, Yi); the coordinates of the end point of this optical flow as (Xi', Yi'); the coordinates of the start point of the second optical flow are expressed as (Xj, Yj) (1≦j≦n); and the coordinates of the end point of this optical flow as (Xj', Yj') (1≦j≦n). The first and second optical flows can be freely selected. The amount of rotation dθ obtained by equation 5, the coordinates (Xi, Yi) and (Xj, Yj) of the start points and the coordinates (Xi', Yi') and (Xj', Yj') of the end points are substituted in equations 1 and 2 shown above to obtain the value of dx and dy with respect to the first and second optical flows. The obtained two sets of (dx, dy, dθ) are plotted in a three-dimensional dx-dy-dθ space. This operation is performed on all the combinations of the optical flows obtained by the first optical flow detection section 19 to form a multiplicity of point sets in the dx-dy-dθ space. A frame of any size containing the point set having the largest number of points in the multiplicity of point sets, and including a number of points equal to or larger than a certain number is extracted in the dx-dy-dθ space, and the centroid of the frame is obtained. The value of (dx, dy, dθ) corresponding to this centroid is an affine transformation parameter, i.e., the amount of movement.

In the above-described embodiment, the reflecting surface 15a of the mirror 15 is a flat surface. However, the reflecting surface 15a may be formed as a curved surface according to a purpose.

The mobile unit 10 on which the distance measuring apparatus S of the present invention is mounted is not limited to a robot. For example, it may be a vehicle.

In the above-described embodiment, the mobile unit 10 moves only in directions parallel to the reference plane M. However, the mobile unit 10 may move in a direction perpendicular to the reference plane M. In such a case, the mirror 15 is adjusted so that the second optical axis portion L2 is always parallel to the reference plane M and extends close to the reference plane M.

In the present invention, the distance measuring apparatus S detects the distance to the object B in a stationary state while the apparatus S is moving. However, the distance measuring apparatus S may detect the distance to the object B while the object B is moving. When the object B moves, the distance measuring apparatus S may be standing still.

The second optical axis portion L2 from the reference plane M is not necessarily set at a small distance from the reference plane M. The distance may be selected so as not to exceed the height of the object B.

The present examples and embodiments are to be considered as illustrative and not restrictive and the invention is not to be limited to the details given herein, but may be modified within the scope and equivalence of the appended claims.

The invention claimed is:

1. An object detection apparatus for detecting an object on a reference plane, wherein relative positions of the object and the object detection apparatus change on the reference plane, the apparatus comprising:
   an image pickup device, which captures an image in a predetermined image pickup area, thereby obtaining image data;
   an image cutting section, wherein the image cutting section cuts an image received by the image pickup device such that the image pickup device receives an image that is divided into a reference plane image and an object image by a predetermined boundary, wherein the reference plane image contains the reference plane, and wherein the object image contains the object and does not contain the reference plane;
   a computer, wherein, from image data obtained by the image pickup device, the computer obtains reference plane image data corresponding to the reference plane image and object image data corresponding to the object image, and wherein the computer computes relative positions of the object and the object detection apparatus on the reference plane based on an optical flow obtained from the reference plane image data and an optical flow obtained from the object image data.

2. The object detection apparatus according to claim 1, wherein the object detection apparatus is mounted on a mobile unit that moves on the reference plane, and wherein the computer computes an amount of movement of the mobile unit based on an optical flow obtained from the reference plane image data.

3. The object detection apparatus according to claim 2, wherein the computer obtains a plurality of optical flows from the reference plane image data, and wherein, by performing Hough transform using the coordinates of the start points and the coordinates of the end points of at least two of the obtained optical flows, the computer computes the amount of movement of the mobile unit.

4. The object detection apparatus according claim 2, wherein the computer computes a distance from the mobile unit to the object based on an optical flow obtained from the object image data and the computed amount of movement.

5. The object detection apparatus according to claim 1, wherein the image cutting section includes a reflecting body having a reflecting surface, and wherein the reflecting surface is located in a part of the image pickup area of the image pickup device.

6. The object detection apparatus according to claim 5, wherein the object image received by the image pickup device is an image that is reflected by the reflecting surface.

7. The object detection apparatus according to claim 5, wherein an angle θ1 of the reflecting surface relative to the reference plane is half an angle θ2 of an optical axis extending from the image pickup device toward the reference plane.

8. The object detection apparatus according to claim 7, wherein the angle θ2 is 90°.

9. A distance measuring apparatus, wherein the apparatus is mounted on a mobile unit that moves on a reference plane, and measures a distance from the mobile unit to an object, the apparatus comprising:
   an image acquisition section, wherein the image acquisition section obtains a reference plane image and an object image, wherein the reference plane image contains the reference plane, and wherein the object image contains the object and does not contain the reference plane;
   a movement amount computation section, wherein the movement amount computation section computes an amount of movement of the mobile unit based on an optical flow obtained from the reference plane image; and
   a distance computation section, wherein the distance computation section computes a distance from the mobile unit to the object based on an optical flow obtained from the object image and the amount of movement of the mobile unit computed by the movement amount computation section.

10. The distance measuring apparatus according to claim 9, wherein the image acquisition section includes:
   an image pickup device, which captures an image in a predetermined image pickup area, thereby obtaining image data; and
   an image cutting section, wherein the image cutting section cuts an image received by the image pickup device such that the image pickup device receives an image that is divided into the reference plane image and the object image by a predetermined boundary.

11. The distance measuring apparatus according to claim 10, wherein the image cutting section includes a reflecting body having a reflecting surface, and wherein the reflecting surface is located in a part of the image pickup area of the image pickup device such that the object image received by the image pickup device is an image that is reflected by the reflecting surface.

12. The distance measuring apparatus according to claim 11, wherein an angle θ1 of the reflecting surface relative to the reference plane is half an angle θ2 of an optical axis extending from the image pickup device toward the reference plane.

13. The distance measuring apparatus according to claim 12, wherein the angle θ2 is 90°.

14. The distance measuring apparatus according to claim 9, wherein the movement amount computation section obtains a plurality of optical flows from the reference plane image data, and wherein, by performing Hough transform using the coordinates of the start points and the coordinates of the end points of at least two of the obtained optical flows, the movement amount computation section computes the amount of movement of the mobile unit.

15. An object detection method for detecting an object on a reference plane using an image pickup device, wherein relative positions of the object and an object detection apparatus change on the reference plane, the method comprising:
   cutting an image received by the image pickup device such that the image pickup device receives an image that is divided into a reference plane image and an object image by a predetermined boundary, wherein the reference plane image contains the reference plane, and wherein the object image contains the object and does not contain the reference plane;
   obtaining reference plane image data corresponding to the reference plane image and object image data corresponding to the object image from image data obtained by the image pickup device;
   computing relative positions of the object and the object detection apparatus on the reference plane based on an optical flow obtained from the reference plane image data and an optical flow obtained from the object image data.

16. The method according to claim 15, wherein the image pickup device is mounted on a mobile unit that moves on the reference plane, the method further comprising:
   computing an amount of movement of the mobile unit relative to the reference plane based on an optical flow obtained from the reference plane image data; and
   computing a distance from the mobile unit to the object based on an optical flow obtained from the object image data and the computed amount of movement.

17. The method according to claim 16,
   wherein, when the amount of movement is computed, a plurality of optical flows are obtained from the reference plane image data, and Hough transform is performed using the coordinates of the start points and the coordinates of the end points of at least two of the obtained optical flows.

18. The method according to claim 17, wherein, when an image received by the image pickup device is cut, a reflecting body having a reflecting surface is located in a part of the image pickup area of the image pickup device such that an image reflected by the reflecting surface of the reflecting body becomes the object image received by the image pickup device.

19. The method according to claim 18, wherein an angle θ1 of the reflecting surface relative to the reference plane is half an angle θ2 of an optical axis extending from the image pickup device toward the reference plane.

20. The method according to claim 19, wherein the angle θ2 is 90°.

* * * * *